United States Patent [19]

Bearden et al.

[11] E Re. 31,604

[45] Reissued Jun. 19, 1984

[54] MULTI-LAYER WELL SCREEN

[75] Inventors: William G. Bearden; George C. Howard, both of Tulsa, Okla.

[73] Assignee: Standard Oil Company (Indiana), Chicago, Ill.

[21] Appl. No.: 753,049

[22] Filed: Dec. 22, 1976

Related U.S. Patent Documents

Reissue of:

[64] Patent No.: 3,712,373
Issued: Jan. 23, 1973
Appl. No.: 77,492
Filed: Oct. 2, 1970

[51] Int. Cl.[3] ..... E21B 43/08

[52] U.S. Cl. ..... 166/232; 166/233

[58] Field of Search ..... 210/497.01, 497.1, 499; 166/227, 230, 232, 234, 236, 233

[56] References Cited

U.S. PATENT DOCUMENTS

| | | | |
|---|---|---|---|
| 65,276 | 5/1867 | Ricker | 166/233 X |
| 85,428 | 12/1868 | Burditt | 166/236 X |
| 713,544 | 11/1902 | Ware | 166/233 X |
| 1,406,825 | 2/1922 | Dobson | 166/233 X |
| 2,729,294 | 1/1956 | Adams | 166/231 |
| 2,877,852 | 3/1959 | Bashara | 166/234 X |
| 3,385,373 | 5/1968 | Brown | 166/232 |
| 3,389,797 | 6/1968 | Giardini | 210/497.1 X |

FOREIGN PATENT DOCUMENTS

| | | | |
|---|---|---|---|
| 162472 | 4/1955 | Australia | 166/233 |
| 213162 | 7/1956 | Australia | 210/497.1 |
| 5703 | 4/1906 | France | 210/497.1 |
| 29-2766 | 3/1954 | Japan | 173/233 |

*Primary Examiner*—William F. Pate, III
*Attorney, Agent, or Firm*—John D. Gassett; Scott H. Brown; Fred E. Hook

[57] ABSTRACT

This is a special downhole multi-layer sand screen for oil and other fluids containing sand. The preferred embodiment of the sand filter includes an outer screen, an intermediate screen and an inner screen although another embodiment may have only an outer and an inner screen. The outermost screen is of larger spacing to retain only the coarser sand particles and the openings in the inner two screens are progressively smaller to retain the less coarse sand material. The coarser sand particles bridge about the larger openings in the outer screens and progressively finer sand materials bridge across the intermediate and inner screens.

3 Claims, 5 Drawing Figures

MULTI-LAYER WELL SCREEN

Matter enclosed in heavy brackets [ ] appears in the original patent but forms no part of this reissue specification; matter printed in italics indicates the additions made by reissue.

BACKGROUND OF THE INVENTION

1. Field of of Invention

This invention relates to a sand filter for producing fluids through well bores from subsurface formations. It relates especially to a multi-layer sand screen for removing the sand before it is produced through the well bore.

2. Setting of the Invention

Oil and gas are produced from underground formations through well bores drilled from the surface to the formation. Some oil and gas are contained in the pores of consolidated rocks or sand. When this oil is produced through the well bore, it is relatively free of any rock particles or sand. However, many oil and gas wells produce fluid from underground formations which are not consolidated. That is, the various sand particles are not strongly attached to each other and when the fluid is produced it carries entrained sand with it. This sand causes serious damage to well equipment. In producing oil and gas from such unconsolidated formations some method must be provided to restrain the said inflow into the well. There are four primary methods previously in use for this. These are:

1. Consolidation of the formation with plastic binding agent.
2. Placing a screen in the well with sufficiently small openings to prevent inflow of all undesired material.
3. Use of a gravel pack placed in the annular area between a screen and the formation; the voids between the gravel grains being small enough to prevent inflow.
4. Placing a screen in a well consisting of a mechanical screen and a preformed "gravel pack" attached to the screen.

All of these methods, with the exception of the first one, have one common characteristic; they restrain material all on one surface. This provides a perfect environment for plugging, i.e., coarse and fine materials are restrained together, permitting progressive plugging of the screen until essentially complete plugging occurs.

Method number 1, while desired, is very difficult and in some instances impossible to perform in the field. Screens as described in number 4 above have been utilized in the Tar Sands project of Northern Canada with success, but they are easily plugged during installation. This plugging again all occurs at essentially the outer surface of the liner.

Thus, there is a need for a sand filter which prevents such surface plugging and the tendency to plug during installation.

BRIEF DESCRIPTION OF THE INVENTION

This is a well screen or sand filter which is made by wrapping multiple layers of wire around a slotted pipe connected to the lower end of a string of tubing. The outer layer of wire forms a screen which has a wide spacing between adjacent spirals of wire which retains only the coarser sand particles. The spacing between these wires should be as great or greater than the diameter of the grain size at the five percentile point on a cumulative screen analysis curve. The spacing of the wire of the intermediate layer is smaller and is typically greater than the grain size of the diameter of the grain at the twenty percentile point of the cumulative screen analysis curve. The innermost layer, if one is used, is of a reduced spacing from that of the intermediate layer and the spacing is typically greater than the grain size at the 50 percentile point but less than 2 times the grain size at the 15 percentile point. The pores of the sand particles trapped at the outer layer are noticeably large. The pores of sand particles become smaller at each successive layer of screen.

BRIEF DESCRIPTION OF THE DRAWINGS

Various objectives and a better understanding can be had of the invention by the following description taken in conjunction with the invention in which.

DETAILED DESCRIPTION OF THE INVENTION

Figure 1:
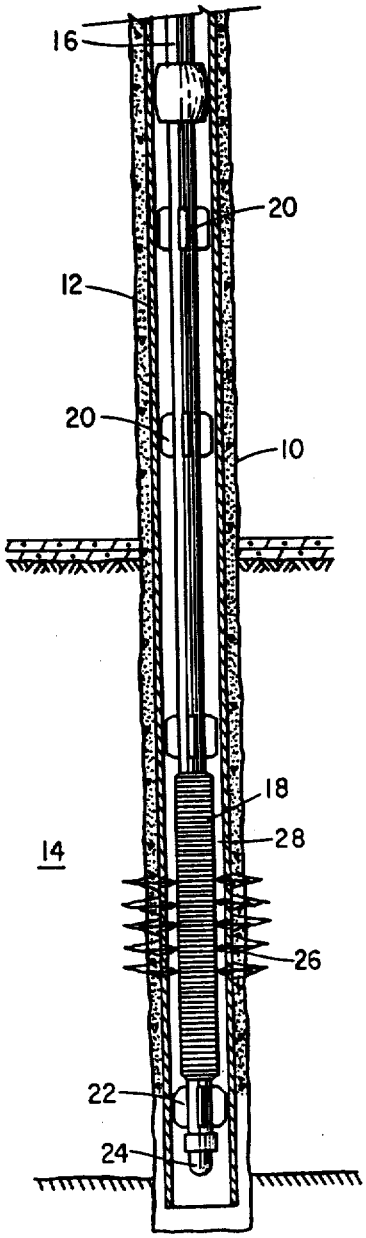
FIG. 1 illustrates a downhole view of a sand sceen of this invention connected to the lower end of a string of tubing.

Attention is first directed to FIG. 1. Shown in FIG. 1 is a well bore 10 having a casing 12 therein. Well bore 10 through formation 14 which is an unconsolidated formation which produces sand with the produced fluid. Shown in casing 12 is a tubing string 16 to which is attached a triple wire-wrapped screen filter 18 of this invention. Immediately above sand filter 18 is a plurality of centralizers 20 mounted on tubing 16. Immediately below filter 18 is a centralizer 22. A bull plug 24 closes the lower end of the sand filter 18. Oil is produced through perforations 26 in casing 12 into annulus 28 and then through sand screen 18 and up the well bore through tubing 16. There should be some space between the outer surface of filter 18 and the inner surface of casing 12. This should be sufficient to allow washing over the screen, if necessary, when it is removed from the well. Typically for 5½ inches OD casing 12, screen 18 would have a maximum OD of about 3¼ inches.

Figure 2:
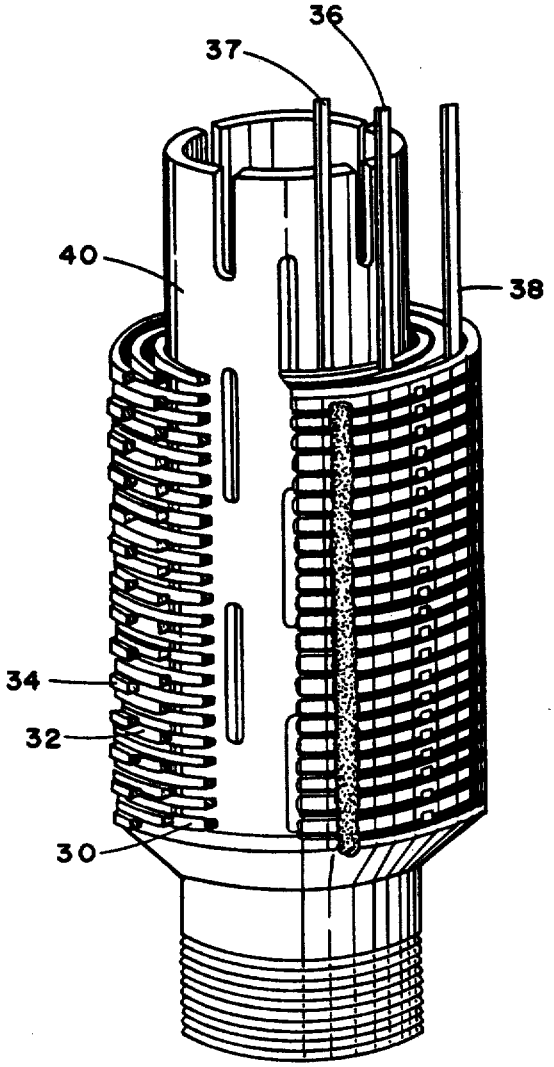
FIG. 2 illustrates an enlarged view of the sand filter of this invention shown partly in full face and partly in cutaway.
Figure 3:
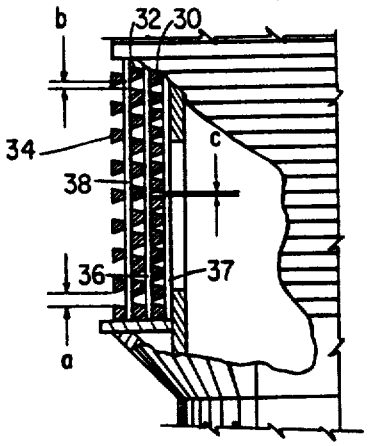
FIG. 3 is a partial view of the multi-layer well screen indicating dimensions between the wire of the various layers.

Attention is next directed to FIG. 2 which shows a cutaway view illustrating the three layers of wrapped wire of the sand filter 18. This includes an inner layer 30, an intermediate layer 32 and an outer layer 34. Spacer bars or ribs 36 hold layer 32 from layer 30 and spacer bars 38 likewise hold layer 32 from outer layer 34. A spacer bar 37 is preferably provided between the inner layer 30 and slotted pipe 40. A sufficient number of spacer bars 36, 37 and 38 are preferably provided to give the proper support and radial spacing between the various layers although such ribs are not essential. All of these layers enclose a slotted pipe section 40. Each layer, 30, 32 and 34, of the filter is made, in the example shown in FIG. 2, by a keystone-shaped wire wrapped in a slightly spiralling configuration. The spacing between the wires of the outer layer 34 is the largest and the spacing of the other layers, 32 and 30, is preferably progressively reduced. As shown in FIG. 3 the spacing between adjacent spirals of wire in the outer layer is indicated by a, the spacing of the intermediate layer by b and the innermost layer by c. For best results in most sand problems a is greater than b and b is greater than c.

Figure 4:
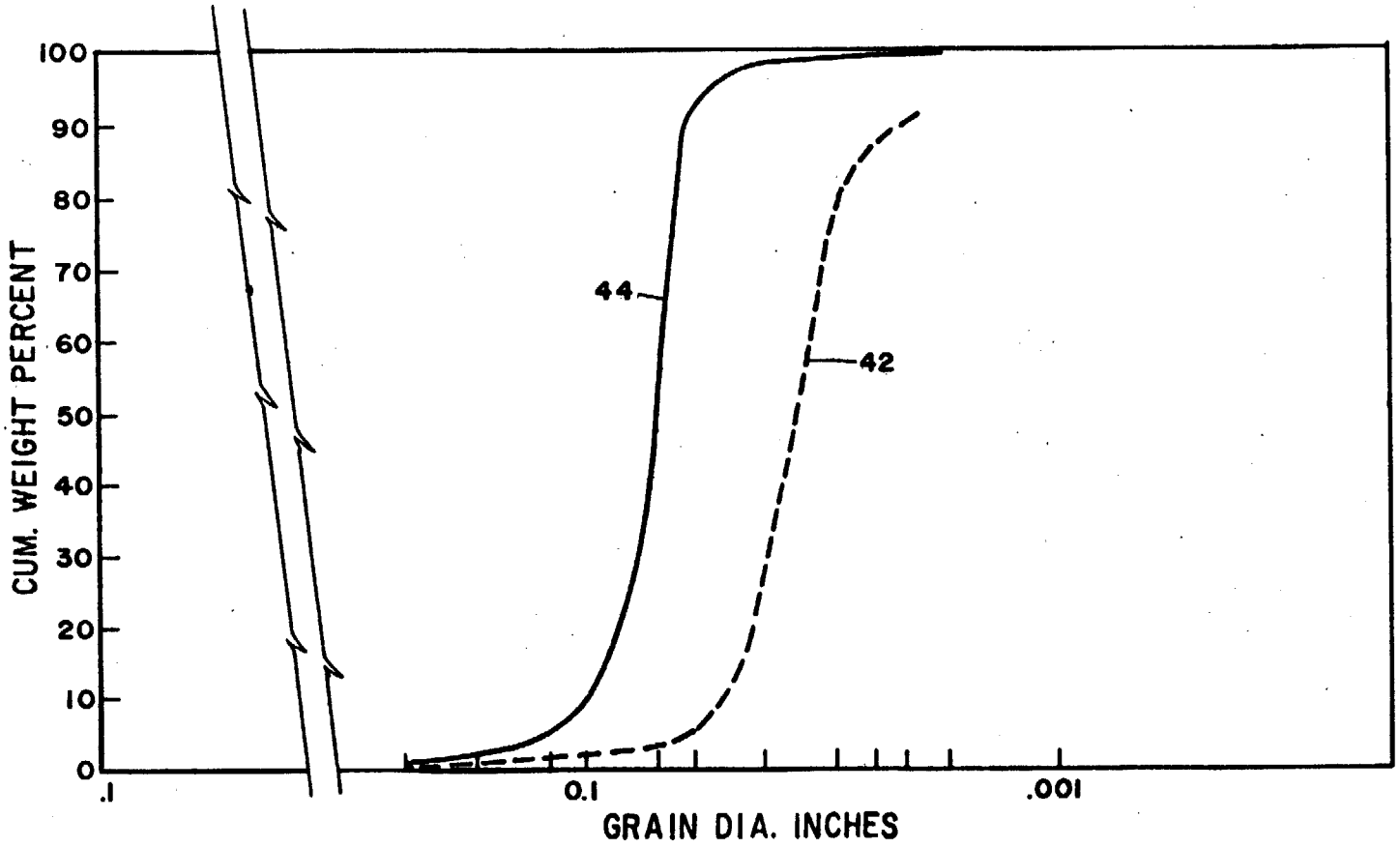
FIG. 4 illustrates typical cumulative screen analysis curves of sand samples.

To determine the dimensions of a, b and c, in the best method we presently know, one should first prepare a cumulative screen analysis curve of the sand which the screen is supposed to restrain. It is sometimes difficult to obtain accurate sampling of the sand which causes the problem. However, if a well has sanded up, the sand must be removed from the well. There are conventional means for washing out such sand. The sand thus removed is collected and a sample taken of such sand. This sample is then analyzed to determine the cumulative screen analysis curve. Two such typical curves are shown in FIG. 4. The ordinate is cumulative weight percent and the abscissa represents the sand size. Curve 42 represents a sample of a Miocene sand in the High Island Field, Galveston County, Texas. Curve 44 represents a sample of the Miocene sand in the Edgerly Field, Calcasieu Parish, Louisiana. The method of obtaining these curves is rather straightforward. The sample is passed through a large screen and the weight of the sample retained is noted. Progressively smaller sized screens are used and the retention of sand on each such screen is recorded. From these data a cumulative screen analysis curve can readily be plotted. It has been found that the spacing of the wire in the various layers 30, 32 and 34 has a relationship to the cumulative screen analysis curve. Typically, the spacing of the wires of the outer layer should be equal to or slightly greater than the diameter of the sand particles or grain size at the 5 percentile point of the cumulative screen analysis curve for the sample of the sand which causes all the problems. The spacing of the wire of the middle layer 32 should be equal to or slightly greater than the grain size at the 20 percentile point of the cumulative screen analysis curve and the spacing of the wire of the inner layer 30 should be greater than the sand dimension at the 50 percentile point, but less than 2 times the grain dimension at the 15 percentile point. Using this criteria then for the cumulative screen analysis curve in the Miocene sand in the Edgerly Field, "a" is greater than 0.012, "b" greater than 0.0084 and "c" between 0.007 and 0.018.

In using the sand filter of this invention it is seen that the pores of the sand particles trapped at the outer layer are relatively large and become smaller at each successive layer of wrapping. The innermost layer 30 is fine enough to trap the sand particles but allows passage of silty material, often contained in the water used during installation. After installation, influx and entrapment of the sand within the screen forms a precast permeable filter in situ.

It is anticipated that at least in the near future the largest use of these screen filters will be in wells drilled which have experienced sanding problems. There is no great difficulty in installing the filter of the type shown in FIG. 1, for example, in these wells. The accumulated sand is washed from the well with preferably clean brine. Ordinarily there is a packer element positioned above the screen assembly. Due to this, the tubing to which the assembly is attached should be lowered at a slow rate, e.g., about one 30-foot joint per minute, to keep from surging the formation and to prevent sand from entering the well before the screen is set on bottom.

This filter device when properly sized can merely be set opposite the producing formation. When the well is produced, the unconsolidated sand will fill the annular space between the casing and the screen but it will not plug the screen because of the gradation of the openings. If desired, however, the multi-layered screen could be "gravel packed" in place by filling the annulus between the filter and the casing with a large sized sand. The use of the multi-layered screen in this instance will allow the use of larger sized gravel than normally used and would still resist plugging from any sand particles penetrating the gravel pack, and would provide greatly increased resistance to erosional failures, since erosion of a hole in the outer layer would not prevent the other layers from filtering.

Figure 5:
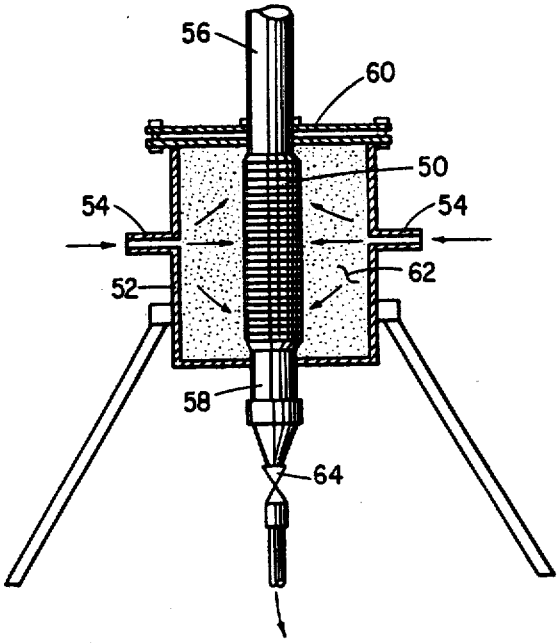
FIG. 5 illustrates an apparatus for determining the effectiveness of a sand filter.

A multi-layer well screen filter was evaluated at Pan American's Research Center in Tulsa, Oklahoma, for its ability to restrain sand production into a well bore. In that particular well filter, three separate layers of keystone-shaped wire were wrapped around 5½ inch slotted casing. Spacing between the outer, intermediate and inner wire was 0.030 inch, 0.020 inch and 0.010 inch, respectively. The cross-sections of the wire were $0.0125 \times 0.125 \times 100$ inch. Each wire wrap layer was separated from the other layer by longitudinal ribs as indicated in FIG. 2. These ribs separate the layers by a distance at least as great as the dimension of the spacing between the outer of the two layers involved. Typically, these ribs separate the layers by about 0.080 inch. The use of these ribs also provides for vertical flow within the screen assembly. The filter was mounted in a flow test model as shown in FIG. 5. This includes a screen filter assembly 50 mounted within a cylindrical cell 52 which has inlets 54. Screen filter assembly 50 is connected to an upper pipe section 56 and a lower pipe section 58. These two sections are sealed with cell 52. Cell 52 has a top 60 so that sand 62 can be placed within the cell. In one experiment sand 62 was a clean Athabasca Tar Sand which has a fifty percentile grain diameter of about 0.0058 inch. Its grain size distribution falls between the two curves of FIG. 4. Diesel oil was flowed inwardly through inlets 54 through the sand 62, the screen filter assembly 50 and out the lower pipe 58 and valve 64. The data obtained in the performance of this test are summarized in Table I below:

TABLE I

Summary of Flow Test Data

| cum. vol Gal | Q, Gal/Min | cum. Time Min | Press. Causing Flow,psi | Flow Index Gal/Min/psi | Sand Produced Grams | Gms Sand produced/1000 Gal |
|---|---|---|---|---|---|---|
| 1386 | 23.1 | 60 | 2 | 11.5 | 45 | 32.5 |
| 3036 | 27.5 | 120 | 2 | 13.6 | 43 | 26.1 |
| 3825 | 26.3 | 150 | 2 | 13.2 | trace of fines | trace |

The data shown in Table I indicate that approximately 88 grams of sand were produced while flowing the initial approximately 3,000 gallons (72 bbls) of diesel oil through the sand-packed screen and that only a trace of fines were produced with the last 789 gallons of fluid (18.8 bbls). The amount of sand produced per unit volume decreases sharply with the successive runs, indicating that effective bridging of the sand particles occurred after flowing a relatively small volume of fluid through the screen. Theoretically, only these fines should continue to be produced. In actual field practice a trace of fines would not produce any difficulties with well equipment. The data also indicate that very high production rates may be maintained with a multi-layer screen.

A triple wire wrapped screen as described in FIG. 2 and having spacings of "a" of 0.030, "b" of 0.020 and "c" of 0.010 was built and then placed on test in the Edgerly Field, Calcasieu Parish, Louisiana. For 5 months now the well has produced 120 barrels of fluid per day with about a 60 percent water cut. No sand has been produced and no apparent restriction in the flow capacity of the screen has been observed. Only future production history will determine the duration or time that this filter is effective. In the past, gravel pack sand retention means had been provided. The gravel pack causes a certain amount of flow restriction and ordinarily has to be replaced and cleaned every ½-24 months.

Another recent installation of the screen assembly was made in the High Island Field, Galveston County, Texas. A sand screen assembly was installed in which the dimensions of the spacing between the various layers of screens "a", "b" and "c" equaled 0.030 inch, 0.015 inch and 0.008 inch, respectively. Initially, the well produced 120 barrels of load fluid and 300 barrels of oil with no show of sand. However, after about 3½ months the assembly became plugged. The exact cause of the plugging has not been determined. However, it is the preliminary opinion that most of the plugging was caused by backwashing with dirty fluid. Since these installations, similar screens have been satisfactorily installed in several other wells with apparent good results.

While the above embodiments have been described with a great amount of detail, it is possible to make other variations without departing from the spirit and the scope of the invention.

We claim:

[1. A sand screen filter assembly for use in a well bore which comprises:

a slotted section of pipe;

a first layer of wire screen mounted about said pipe and having spacing "c" between wires of said first layer;

a second layer of wire screen positioned about said first layer, the dimension "b" of the spacing between wires of the second layer of wire screen being greater than "c", said second layer being spaced from said first layer.]

[2. A screen filter assembly as defined in claim 1 in which the radial distance between the first layer of wire screen and the second layer of wire screen is at least as great as the dimension "b".]

[3. A sand screen filter assembly as defined in claim 1, including a third layer of wire screen positioned about said second layer, the dimension of the spacing between adjacent wires of the third layer of wire screen being greater than "b".]

[4. A screen filter assembly as defined in claim 3 in which the radial distance between the first layer of wire screen and the second layer of wire screen is at least as great as the dimension "b" and the radial distance between the second and third layers of wire screen is at least as great as the spacing between adjacent wires of said third layer of wire screen.]

[5. A screen filter assembly as defined in claim 4 in which longitudinal rods are placed between the said layers of wire screen to give radial spacing and support.]

[6. A screen filter assembly as defined in claim 5 in which the slots of said slotted section of pipe are sufficiently large so as to have essentially no filtering effect.]

[7. A sand screen filter assembly for use in a well bore which comprises:

a first layer of wire wound into an elongated hollow shape and having a spacing c between adjacent turns of wire;

a second layer of wire having a spacing greater than c between the turns thereof and wound into an elongated hollow shape surrounding said first layer and spaced therefrom;

means closing the upper end and the lower end of the annulus between said first layer and said second layer.]

[8. A sand filter for use in a well bore drilled in the earth which comprises a plurality of concentric layers of wire each wound into an elongated hollow shape, said layers spaced radially from one another providing clear unobstructed fluid flow space between such adjacent layers with such space having no filtering material therein, the spacing between adjacent turns of said wire in any one layer being no larger than the spacing between adjacent turns of said wire in any layer of larger diameter and no smaller than the spacing between adjacent turns of wire in any layer of smaller diameter.]

*9. A sand screen filter assembly for use in a wellbore which comprises:*

*a slotted section of pipe;*

*a first layer of wire screen concentrically positioned about said pipe and having a fixed spacing "c" between wires of said first layer;*

*a second layer of wire screen positioned about and spaced from said first layer and having fixed spacing "b" between wires of said second layer, said spacing "b" being greater than said spacing "c";*

*a third layer of wire screen positioned about and spaced from said second layer and having a spacing "a" between wires of said third layer, said spacing "a" being greater than said spacing "b";*

*a plurality of longitudinal rods secured between and to said layers of wire screens to give fixed radial spacing with such spacing having no filtering material therein; and*

*the radial distance between said first layer and said second layer of wire screen is at least as great as said spacing "b" and the radial distance between said second and third layers of wire screen is at least as great as said spacing "a".*

*10. A sand screen filter assembly for use in a wellbore which comprises:*

*a slotted section of pipe;*

*a first layer of wire screen concentrically positioned about said pipe and having a fixed spacing "c" between wires of said first layer;*

*a second layer of wire screen positioned about and spaced from said first layer and having a fixed spacing "b" between wires of said second layer, said spacing "b" being greater than said spacing "c";*

*a third layer of wire screen positioned about and spaced from said second layer and having a spacing "a" between wires of said third layer, said spacing "a" being greater than said spacing "b";*

*a plurality of longitudinal rods secured between and to said layers of wire screens to give fixed radial spacing*

*with such spacing having no filtering material therein; and*

*said spacing "a" is equivalent to a mesh size capable of capturing approximately 50% wt. of formation sand, said spacing "b" is equivalent to a mesh size capable of capturing approximately 20% wt. of formation sand, and said spacing "c" is equivalent to a mesh size capable of capturing approximately 5% wt. of formation sand.*

*11. A sand screen filter assembly as in claim 9 wherein said spacing "a" is equivalent to a mesh size capable of capturing approximately 50% wt. of formation sand, said spacing "b" is equivalent to a mesh size capable of capturing approximately 20% wt. of formation sand, and said spacing "c" is equivalent to a mesh size capable of capturing approximately 5% wt. of formation sand.*

* * * * *